United States Patent [19]
Takada

[11] 3,885,811
[45] May 27, 1975

[54] SELECTIVELY ENGAGEABLE THREE POINT VEHICLE SAFETY BELT

[75] Inventor: Takezo Takada, Hikone, Japan

[73] Assignee: Takata Kojyo Co., Ltd., Tokyo, Japan

[22] Filed: Nov. 5, 1973

[21] Appl. No.: 412,949

[30] Foreign Application Priority Data
Nov. 6, 1972  Japan.............................. 47-127220
Nov. 6, 1972  Japan.............................. 47-127221

[52] U.S. Cl.............................. 280/150 SB; 24/246
[51] Int. Cl............................................. B60r 21/10
[58] Field of Search..... 280/150 SB; 24/247, 246 X, 24/245

[56] References Cited
UNITED STATES PATENTS
1,570,625  1/1926  Eddins................................. 24/247
3,583,764  6/1971  Lohr............................. 280/150 SB

*Primary Examiner*—Robert R. Song
*Attorney, Agent, or Firm*—Wolder & Gross

[57] ABSTRACT

A vehicle safety belt includes a shoulder belt and a lap belt. A buckling tongue is adjustably attached to the end of the lap belt and includes a free rear section having a large front circular opening connected by a restricted passageway to a small rear opening. A coupling plate is attached to the end of the shoulder belt and carries a perpendicular coupling pin having a head of a diameter less than the front opening and greater than the rear opening, an intermediate cylindrical section of a diameter less than the rear opening and greater than the passageway width and a base section of a width less than the passageway width. An axially arched spring annulus engages the pin base section.

12 Claims, 6 Drawing Figures

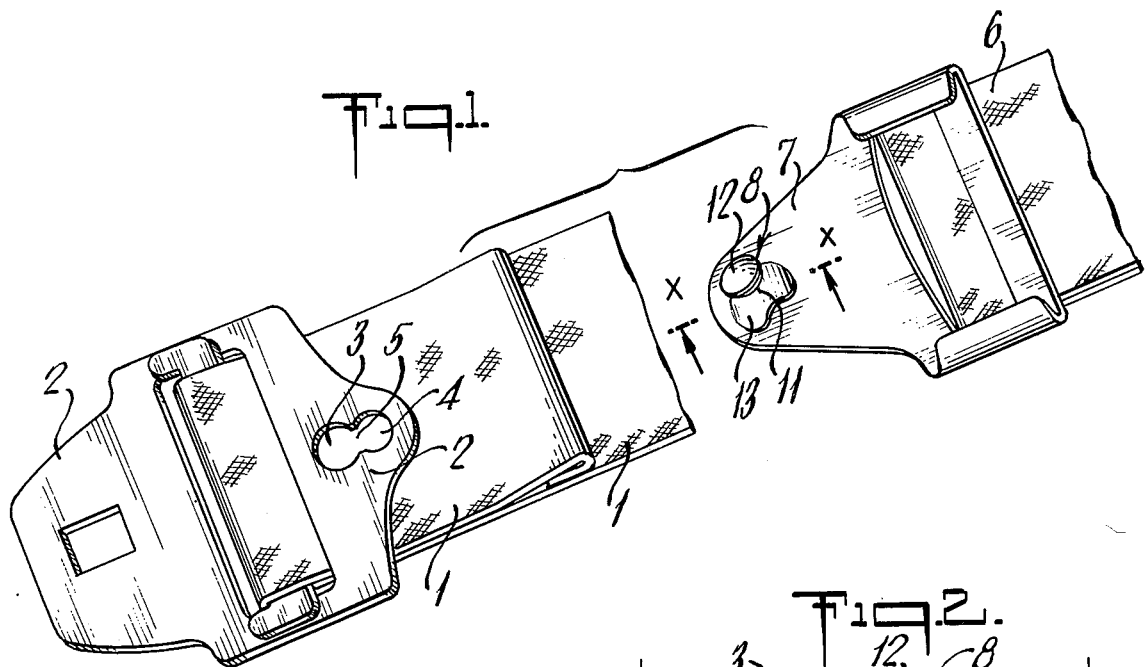
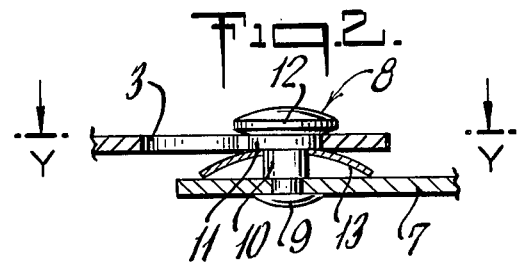
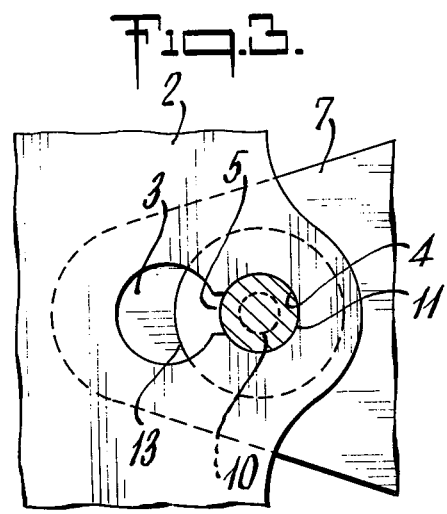
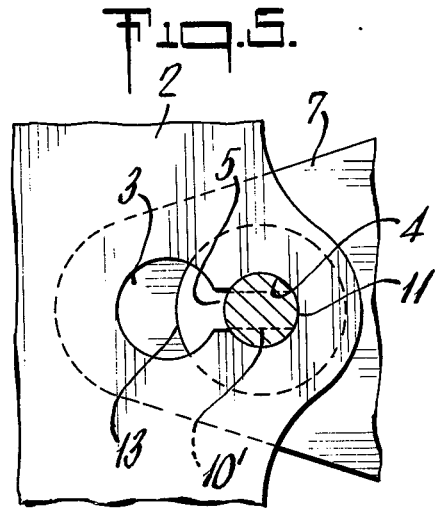
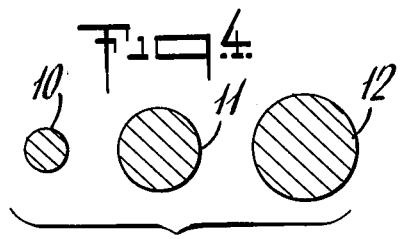
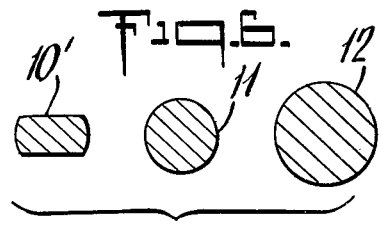

SELECTIVELY ENGAGEABLE THREE POINT VEHICLE SAFETY BELT

BACKGROUND OF THE INVENTION

The present invention relates generally to improvements in vehicle safety belts and it relates more particularly to an improved three point safety belt of the type wherein the lap belt may be selectively employed with or without the shoulder belt.

The conventional three point vehicle safety belt generally includes a shoulder belt and a lap belt whose outer ends are joined at a point proximate one of the buckle members, either the buckle or the buckle coupling tongue. It is frequently desirable to employ the lap belt without the shoulder belt and to this end it has been a practice to separably join the ends of the lap and shoulder belts so that the lap belt may be selectively used with or without the shoulder belt. However, the coupling devices heretofore employed and proposed for separably connecting the lap and shoulder straps possess numerous drawbacks and disadvantages. They are unreliable, frequently inadvertently uncoupling under stress conditions, such as those frequently encountered in an accident, they are difficult to couple and intentionally uncouple, are often complex and of little versatility and otherwise leave much to be desired.

SUMMARY OF THE INVENTION

It is a principal object of the present invention to provide an improved vehicle safety belt system.

Another object of the present invention is to provide an improved three point safety belt which may be selectively employed with or without the shoulder belt portion.

Still another object of the present invention is to provide a three point safety belt having an improved coupling for separably joining the lap and shoulder belt portions.

A further object of the present invention is to provide an improved system of the above nature characterized by its reliability, ruggedness, ease and simplicity of operation and application and great versatility and adaptability.

The above and other objects of the present invention will become apparent from a reading of the following description taken in conjunction with the accompanying drawings which illustrate a preferred embodiment thereof.

In a sense, the present invention contemplates the provision of a safety belt system comprising a lap belt and a shoulder belt, a first coupling section attached to one belt and a second coupling section attached to the other belt, the first coupling section having a first large opening and a second small opening joined by a restricted passageway and the second coupling including a coupling pin having an enlarged outer head of greater width than the small opening and lesser width than the large opening, an intermediate section of smaller width than the small opening and greater width than the passageway, and a base section of lesser width than the passageway, the pin being axially movable in the second opening when in engagement therewith between a lock position with the pin intermediate section engaging the second opening and aligned with the passageway and an unlock position with the intermediate portion out of engagement with the second opening and the inner base portion in alignment with the passageways.

In the preferred form of the present system the first coupling section is integrally formed with and projects rearwardly from a buckle tongue plate attached to the end of the lap belt and the openings are circular and the passageway is a short slot. The second coupling section includes a plate attached to the end of the shoulder strap, the coupling pin being perpendicularly mounted thereon and the various pin sections being of circular transverse cross section. An axially arched spring annulus engages the pin base section and resiliently bears on the shoulder delineating the pin base and intermediate sections so that when the pin registers with the second opening, it is urged by the spring annulus to its lock position.

The improved safety belt coupling is highly reliable, rugged, easy and simple to operate and of great versatility and adaptability. The coupling sections require no predetermined orientation for their coupling and uncoupling, and are freely angularly movable relative to each other in their locked coupled condition. Moreover, the coupling withstands the high stresses attendant to accidents without separating.

BRIEF DESCRIPTION OF THE DRAWINGS

FIG. 1 is a fragmentary perspective view of the outer ends of the lap and shoulder belts of a system embodying the present invention and illustrated in the uncoupled condition of the lap and shoulder belts;

FIG. 2 is a sectional view taken along line X—X in FIG. 1 in the coupling member locked condition;

FIG. 3 is a sectional view taken along line Y—Y in FIG. 2;

FIGS. 4 are transverse sectional views at different levels of the coupling pin;

FIG. 5 is a view similar to FIG. 3 of another embodiment of the present invention; and FIG. 6 is a view thereof similar to FIG. 4.

DESCRIPTION OF THE PREFERRED EMBODIMENTS

Referring now to the drawings, particularly FIGS. 1 to 4 thereof which illustrate a preferred embodiment of the present invention, the reference numeral 1 generally designates a lap belt and 6 a shoulder belt. Only the outer ends of the lap and shoulder belts 1 and 6 are shown, the arrangement, securement and positioning of the belts being conventional and in accordance with the well known three point system, a suitably mounted buckle of known construction cooperating therewith and being suitably located relative to the associated seat.

A buckle tongue and first coupling section plate 2 is attached to the outer end of the lap belt 1 in a manner which permits the adjustment of the length of the lap belt, the outer end of plate 2 defining the tongue for separable engagement by a mating buckle and the inner end of the plate 2 defining a first coupling section. A transverse aperture is formed in plate 2 between the tongue and coupling sections and has associated therewith a movable transverse bar engaging the looped end of lap belt 1 to permit the length adjustment thereof.

Formed in the coupling section of plate 2 along the medial longitudinal axis thereof are a forward circular opening 3 and a rear circular opening 4 longitudinally spaced from and of smaller diameter than opening 3. A short medially disposed passageway defining longitudinally extending slot 5 having parallel side edges connects and affords communication between openings 3 and 4, and is of a transverse width less than the diameter than the smaller rear opening 4.

A plate 7 having side edges which converge outwardly to a rounded apex is provided along its parallel rear side edges with integrally formed longitudinal channels which support a cross number engaging the looped end portion of shoulder belt 6; the plate 7 defining a second coupling section attached to the end of shoulder belt 6. Medially perpendicularly mounted on plate 7 shortly rearwardly of the apex thereof is a coupling pin 8 which includes a small diameter end shank engaging an opening in plate 7 and terminating in an enlarged head 9 firmly securing the pin 8 to the plate 7.

The coupling pin 8 includes an enlarged outer end head 12 of transverse circular cross section and of a diameter less than that of front opening 3 and greater than that of rear opening 4. Coaxial with and depending from the head 12 is an intermediate cylindrical pin section 11 of transverse circular cross section with a diameter less than that of rear opening 4 and greater than the width of passageway 5, and being of a height approximately equal to the thickness of plate 2. Depending from and coaxial with pin intermediate section 11 is a cylindrical pin lower guide or base section 10 of circular transverse cross section with a diameter less than the width of passageway 5 and a height greater than the thickness of plate 2. Pin sections 10 and 11 are separated by a peripheral shoulder and section 10 is delineated from the pin bottom securing shank by a peripheral shoulder abutting a face of plate 7.

A centrally apertured axially arched resilient spring washer or annulus 13 is formed of a spring metal or a resilient plastic and engages the coupling pin lower section 10. The border of the central opening of the washer 13 bears on the shoulder delineating pin sections 10 and 11 and the outer peripheral edge of washer 13 bears on the confronting face of plate 7.

Considering now the operation of the improved safety belt system, in coupling the lap and shoulder belts for three point use, the coupling pin 8 is inserted through front opening 3 until the pin guide section 10 is in longitudinal alignment with passageway 5, in which position the spring washer 13 is axially compressed. The plate 7 is then pulled to advance the pin guide 10 in sliding movement along passageway 5 from front opening 3 to rear opening 4, at which point the plate 7 is released so that the pin locking intermediate section 11 is axially shifted under the influence of spring washer 13 into engagement with rear opening 4 to prevent movement of coupling pin along passageway 5 to an uncoupling position. While the plates 2 and 7 in this coupled condition are freely relatively rotatable about the axis of pin 8, they are locked in a coupled condition. In uncoupling plate coupling sections 2 and 7, the above procedure is merely reversed. The plate 7 is raised to further compress spring washer 13 and bring pin guide section into alignment with passageway 5 along which it is then slid to front opening 3 where the coupling pin 7 is separated from plate 2. The coupling and uncoupling procedures may be effected independently of the angular relationship and orientation of the longitudinal axes of plates 2 and 7.

Among the advantages achieved by the present improved structure reside in that an accidental disengagement of the coupling sections by a temporary release of the shoulder belt, by swinging or vibration of the coupled sections caused during the car driving and so on after it has been engaged, is completely eliminated in spite of the very simple manner of the engagement procedure of the coupling sections, so as to assure the safety of the driver, and that the voluntary disengagement of the coupling sections is also very simple.

While it is advantageous to shape the intermediate guide section of the coupling pin in a round form, however, the sectional area of this portion is greater for a guide section which is elongated than for the round one in order to withstand the very high tension which may be imparted to the shoulder belt, assuming that the width of the constriction is the same, so that a pin guide section of elongated transverse cross section would be advantageous, since it permits a decrease in the size of the pin and hole, etc.

Thus, in FIGS. 5 and 6 of the drawings which illustrate another embodiment of the present invention which differs from that first described only in the difference in shape in the coupling pin lower or guide section, similar numerals designate similar parts. Aside from the different shape of the coupling pin guide sections, the belt coupling mechanisms are alike. Particularly, in the present embodiment as shown in FIGS. 5 and 6, the lower or guide section 10' of coupling pin 8 is of elongated transverse cross section with parallel side edges and arcuate end edges. The distance between the parallel side edges of pin guide section 10' is slightly less than the passageway 5 and the end edges or faces are coplanar with the peripheral face of the pin intermediate section 11.

The operation of the embodiment last described differs from that first described only in that the pin guide section must be oriented with its longitudinal axis coinciding with that of passageway 5 during transfer between holes 3 and 4.

While there have been described and illustrated preferred embodiments of the present invention, it is apparent that numerous alterations, omissions and additions may be made without departing from the spirit thereof.

I claim:

1. A safety belt system comprising a lap belt, a shoulder belt, a first coupling section attached to one of said belts and having formed therein a first opening and a second opening spaced from and of lesser width than said first opening and a restricted passageway connecting said first and second openings and of lesser width than said second opening, and a second coupling section including a coupling pin having an enlarged outer head portion of greater width than said second opening and of no greater width than said first opening, an intermediate portion of no greater width than said second opening and of greater width than said passageway and an inner portion of no greater width than that of said passageway, said pin being axially movable in said second opening when said pin is in engagement therewith between a lock position with said intermediate portion engaging said second opening and in longitudinal alignment with said passageway and an unlock position with said intermediate portion out of engagement with said second opening and said inner portion in longitudinal alignment with said passageway.

2. The safety belt system of claim 1 including spring means normally urging said coupling pin to its lock position when in engagement with said second opening.

3. The safety belt system of claim 2 wherein said spring means comprises an axially arched spring annulus engaging said coupling pin and bearing on the underface of said first coupling section when said pin registers with said second opening.

4. The safety belt system of claim 1 wherein said first coupling section comprises a first plate member and said second coupling section comprises a second plate member, said coupling pin being perpendicular to said second plate and secured thereto at the base of said pin inner portion.

5. The safety belt system of claim 4 including buckle member, said first plate being integrally formed with the rear portion of said buckle member.

6. The safety belt system of claim 5 wherein said buckle member comprises a buckle coupling tongue attached to said lap belt.

7. The safety belt system of claim 1 wherein said first and second openings are circular and said pin intermediate portion is of circular transverse cross section.

8. The safety belt system of claim 7 wherein said passageway is a longitudinal slot with parallel sides.

9. The safety belt system of claim 7 wherein said pin lower portion is of circular transverse cross section.

10. The safety belt system of claim 7 wherein said pin lower portion is of elongated transverse cross section.

11. A locking device for releasably interlocking a safety shoulder belt to the buckle or tongue coupling portion of a lap belt releasable coupling comprising a connecting plate attached to an end of said shoulder belt, a coupling pin mounted on said coupling plate and having an enlarged head and a locking section, a coupling plate section associated with said buckle or tongue coupling portion and having formed therein a pair of large and small diameter holes interconnected by a restricted cut-off, said pin locking section having a diameter between that of said small hole and the width of said cut-off, and a spring washer engaging said coupling pin, locking engagement between said connecting and coupling plate by said coupling pin being effected by the pressure of said washer on the underportion of said pin locking section.

12. The device of claim 11 wherein said coupling pin includes a portion below said pin locking section of a width not exceeding that of said cut-off.

* * * * *